(12) United States Patent
Wickman (10) Patent No.: US 11,446,722 B2
(45) Date of Patent: Sep. 20, 2022

(54) TUBE AND A METHOD OF MANUFACTURING A TUBE

(71) Applicant: Sandvik Intellectual Property AB, Sandviken (SE)

(72) Inventor: Krister Wickman, Hallstahammar (SE)

(73) Assignee: Sandvik Intellectual Property AB, Sandviken (SE)

( * ) Notice: Subject to any disclaimer, the term of this patent is extended or adjusted under 35 U.S.C. 154(b) by 271 days.

(21) Appl. No.: 16/093,679

(22) PCT Filed: Nov. 14, 2016

(86) PCT No.: PCT/EP2016/077544
§ 371 (c)(1),
(2) Date: Oct. 15, 2018

(87) PCT Pub. No.: WO2017/182111
PCT Pub. Date: Oct. 26, 2017

(65) Prior Publication Data
US 2019/0070650 A1  Mar. 7, 2019

(30) Foreign Application Priority Data

Apr. 22, 2016  (EP) .................................... 16166659

(51) Int. Cl.
*B21C 37/12* (2006.01)
*B23K 9/032* (2006.01)
(Continued)

(52) U.S. Cl.
CPC .......... *B21C 37/122* (2013.01); *B23K 9/0325* (2013.01); *B23K 26/302* (2015.10);
(Continued)

(58) Field of Classification Search
None
See application file for complete search history.

(56) References Cited

U.S. PATENT DOCUMENTS 3,470,605 A * 10/1969 Heinz .................... B21C 37/09
228/143
4,204,862 A   5/1980 Kado et al.
(Continued)

FOREIGN PATENT DOCUMENTS

CN   1093758 A   10/1994
CN   1414892 A   4/2003
(Continued)

OTHER PUBLICATIONS

English machine translation of JP 2012-115890, accessed Sep. 21, 2020, EPO.*
(Continued)

*Primary Examiner* — Xiaobei Wang
(74) *Attorney, Agent, or Firm* — Morgan, Lewis & Bockius LLP (57) ABSTRACT

A high temperature iron-chromium-aluminium (FeCrAl) alloy tube extending along a longitudinal axis, wherein the tube is formed from a continuous strip of a high temperature FeCrAl alloy and comprises a helical welded seam. The high temperature FeCrAl alloy tube is manufactured by feeding a continuous strip of the high temperature FeCrAl alloy toward a tube shaping station, helically winding the strip such that long edges of the strip abut each other and a rotating tube moving forward in a direction parallel to its longitudinal axis is formed, and continuously joining said abutting long edges together in a welding process directly when the tube is formed, whereby a welded tube comprising a helical welded seam is obtained.

21 Claims, 3 Drawing Sheets

(51) Int. Cl.
- C21D 9/08 (2006.01)
- C22C 38/00 (2006.01)
- C22C 38/06 (2006.01)
- C22C 38/22 (2006.01)
- C22C 38/28 (2006.01)
- C22C 38/32 (2006.01)
- C21D 8/10 (2006.01)
- B23K 26/302 (2014.01)
- C22C 38/04 (2006.01)
- C22C 38/24 (2006.01)
- B23K 101/06 (2006.01)
- B23K 103/02 (2006.01)

(52) U.S. Cl.
CPC ............ *C21D 8/105* (2013.01); *C21D 9/08* (2013.01); *C22C 38/00* (2013.01); *C22C 38/001* (2013.01); *C22C 38/005* (2013.01); *C22C 38/04* (2013.01); *C22C 38/06* (2013.01); *C22C 38/22* (2013.01); *C22C 38/24* (2013.01); *C22C 38/28* (2013.01); *C22C 38/32* (2013.01); *B23K 2101/06* (2018.08); *B23K 2103/02* (2018.08)

(56) References Cited

U.S. PATENT DOCUMENTS

| | | |
|---|---|---|
| 6,761,751 B2 | 7/2004 | Berglund et al. |
| 8,435,443 B2 | 5/2013 | Nazmy et al. |
| 2011/0189496 A1 | 8/2011 | Hahn et al. |

FOREIGN PATENT DOCUMENTS

| | | |
|---|---|---|
| CN | 101205587 A | 6/2008 |
| CN | 102162064 A | 8/2011 |
| CN | 102330034 A | 1/2012 |
| CN | 103192234 A | 7/2013 |
| CN | 103484788 A | 1/2014 |
| JP | S52-078612 A | 7/1977 |
| JP | S53-028014 A | 8/1978 |
| JP | H10-140296 A | 5/1998 |
| JP | 2002-363704 A | 12/2002 |
| JP | 2008-100261 A | 5/2008 |
| JP | 2009-057633 A | 3/2009 |
| JP | 2011-161500 A | 8/2011 |
| JP | 2011-528752 A | 11/2011 |
| JP | 2012-115890 A | 6/2012 |
| SU | 780923 A1 | 11/1980 |
| WO | 01/049441 A1 | 7/2001 |
| WO | 2014204388 A1 | 12/2014 |

OTHER PUBLICATIONS

English machine translation of CN 102330034, EPO, accessed Nov. 18, 2020.*
First Office Action dated Apr. 27, 2020 issued in corresponding Chinese Application No. 201680084721.2.
Search Report dated Apr. 20, 2020 issued in corresponding Chinese Application No. 201680084721 2.
Office Action dated Aug. 25, 2020, issued in corresponding Japanese Patent Application No. 2018-555151.
Kurkin, S.A. et al., "Technology, mechanization and automation of the production of welded structures", Mechanical Engineering, 1989, pp. 191-193 and 238.
Search Report dated Jan. 23, 2020 issued in Russian Application 2018140820/02(067852).
Official Action dated Feb. 13, 2020 issued in Russian Application 2018140820/02(067852).
"Thermal Alloys Engineering: Protection Tubes in FeCrAl-Alloys for High Temperature Service", Feb. 1, 2011, XP055287881, Retrieved from the Internet: URL:http://www.thermalloys.com/index/php/en/documents-and-downloads/brochures/5-thermalloys-fecral-protection-tubes/Thermalloys%20FeCrAl%20protection%20tubes.pdf [retrieved on Jul. 12, 2016].
Brensing et al., "Steel Tube and Pipe Manufacturing Process", Dec. 31, 1994, pp. 1-63, XP055286553, Retrieved from the Internet: URL:http://www.smrw.de/files/steel_tube_and_pipe.pdf [retrieved on Jul. 7, 2016].
International Search Report and Written Opinion dated Feb. 7, 2017, issued in corresponding International Application No. PCT/EP2016/077544.
Notice of Reasons for Rejection dated Mar. 9, 2021 in Japanese Application No. 2018-555151.

* cited by examiner

TUBE AND A METHOD OF MANUFACTURING A TUBE

TECHNICAL FIELD

The present disclosure relates to a high temperature iron-chromium-aluminium alloy tube according to the preamble of claim 1 and to a method of manufacturing such a tube according to the preamble of the independent method claim. In particular, but not exclusively, the disclosure relates to said tube for use in heating applications and/or heating devices, such as a radiant tube, a muffle tube, a thermocouple protection tube, a retort tube, a furnace tube, etc.

BACKGROUND AND PRIOR ART

In heating applications, such as in gas-heated or electrically heated furnaces and in heating devices, it is common to use tubes of a material having high temperature resistance, high corrosion resistance and good thermal shock properties. Such tubes include e.g. ceramic tubes, silicon carbide tubes and nickel-chromium (NiCr) alloy-based tubes. In oxidising environments at working temperatures exceeding 1100° C., tubes made from iron-chromium-aluminium (FeCrAl) alloys offer several advantages compared to other tube materials, including an oxidation life and maximum working temperature that exceed by far those of most other materials, such as chromia forming alloys. This is mostly due to the capability of forming a dense and adherent alumina film that protects the FeCrAl material against corrosion and atmospheric attack. Examples of such FeCrAl alloys are the commercially available alloys sold under the trademarks Kanthal® APM and Kanthal® APMT and Kanthal® AF.

FeCrAl alloy tubes can be manufactured as seamless tubes by means of extrusion and as such provide excellent performance and service life in comparison with most other metallic high temperature tube alternatives, in particular under carburising conditions. However, the manufacturing process of such seamless tubes is relatively expensive and complicated and the resulting seamless tubes are therefore costly in comparison to other tubes used in the field. Additionally, there are limitations in manufacturing processes in regard of how large (diameter) tube can be manufactured and also the how thin the wall thickness can be.

SUMMARY

In view of the above mentioned problems, it is desirable to provide a high temperature FeCrAl alloy tube which is less costly and easier to produce and which also may have a large diameter and/or thin wall thickness, but which still has superior properties in terms of oxidation and corrosion resistance and which will thereby achieve a long service life.

This is achieved by means of the initially defined high temperature iron-chromium-aluminium (FeCrAl) alloy tube, which is characterised in that the tube is formed from a continuous strip of iron-chromium-aluminium alloy and that the tube comprises a helical welded seam. The obtained high temperature iron-chromium-aluminium alloy tube thus will have oxidation and corrosion resistances which are very similar to those of a corresponding seamless tube, produced from the similar material. Furthermore, since the proposed tube can be produced by spiral welding from a continuous strip of high temperature FeCrAl material instead of by extrusion, the tube is less costly and easier to produce and may also have larger diameter and/or thinner wall thickness. By means of the proposed tube, excellent oxidation and corrosion resistance at a competitive price can thereby be achieved. According to the present disclosure, the term "high temperature" is meant temperatures above 300° C., such as above 400° C., such as above 500° C.

The proposed welded high-temperature FeCrAl alloy tube is suitable for use in heating applications, e.g. for use as a radiant tube in an electric heating device having a heating element in the form of a heating wire, as a muffle tube, a thermocouple protection tube, a retort tube, a furnace tube, etc.

According to one embodiment, the high-temperature FeCrAl alloy tube has a constant inner diameter or an almost constant inner diameter (d) along a longitudinal axis. By the term "almost constant diameter" is meant that the inner diameter of the high-temperature FeCrAl alloy tube differs less than 10% from one end to the other end of the high-temperature FeCrAl tube.

According to one embodiment, the tube has a wall thickness of 0.5-7.5% of an inner diameter of the high-temperature FeCrAl alloy tube. Thus, the wall thickness may be thinner than, or of the same order as, the wall thickness of a corresponding extruded high-temperature FeCrAl alloy tube, which is normally around 5% of the inner diameter of the tube. The high-temperature FeCrAl alloy tube can thereby be used to replace an extruded seamless tube and achieve similar results.

According to one embodiment, the high-temperature FeCrAl alloy tube has a wall thickness of 0.5-4.5% of an inner diameter of the tube. This thickness is thinner than the wall thickness of an extruded tube. The relatively thin tube walls will bind less thermal energy compared to thicker tube walls and thereby enable quicker heating of the tube and smaller thermal losses. This thin wall thickness is therefore advantageous for heating applications. For a tube having an inner diameter of around 100 mm, which is a common dimension for radiant tubes used in heating applications such as with electrical cartridge heating elements, a wall thickness of 2 mm can e.g. be achieved. In one embodiment, the tube has a wall thickness of 0.5-3.5% of an inner diameter of the tube.

According to one embodiment, the helical welded seam extends at a helix angle of 1 to 89° with respect to the longitudinal axis of the tube. Generally, increasing the helix angle means that a larger diameter of the high-temperature FeCrAl alloy tube can be achieved for the same width of the strip used to produce the tube.

According to one embodiment, the helical welded seam extends at a helix angle of 25-75° with respect to the longitudinal axis of the high-temperature FeCrAl alloy tube.

According to one embodiment, the helical welded seam extends at a helix angle of 40-70° with respect to the longitudinal axis of the tube. This is a typical helix angle interval for tubes having diameters between 70 mm and 500 mm, produced from strip having a width of between 160 mm and 540 mm. For tubes produced from strip having a width of 200 mm, tubes wherein the helical welded seam extends at a helix angle within the interval 47-54° can e.g. be produced, with outer diameters within the range 93-108 mm.

According to one embodiment, the high temperature iron-chromium-aluminium alloy comprises:
5-25 wt. % Cr,
2.5-8 wt. % Al,
0-5 wt. % Mo,
the balance being Fe and normally occurring impurities, and optionally other intentionally added alloying elements.

According to one embodiment, the high temperature iron-chromium-aluminium alloy comprises:

9-25 wt. % Cr,
2.5-8 wt. % Al,
0-5 wt. % Mo, the balance being Fe and normally occurring impurities, and optionally other intentionally added alloying elements. This alloy has excellent oxidation and corrosion resistance.

Other intentionally added alloying elements may be selected from Y, Zr, Hf, Ta, Th, Ti, Si, Mn, B, Sc, Ce, La, W, Nb, V, C, N, O, P and S, of which some elements may also be present in the form of normally occurring impurities. Examples of suitable alloys are iron-chromium-aluminium alloy sold under the trademarks Kanthal® APM and Kanthal® APMT and Kanthal® AF.

The constituents of the high temperature FeCrAl alloy will in the following be described in detail.

Chromium (Cr)

Chromium will promote the formation of the $Al_2O_3$ layer on the high temperature FeCrAl alloy tube through the so-called third element effect, i.e. by formation of chromium oxide in the transient oxidation stage. Chromium shall be present in the alloy in an amount of at least 9 wt. %. However, too high amounts of Cr will promote the formation of intermetallic phases in the tube, therefore the highest amount of Cr is 25 wt. %. According to one embodiment, the amount of Cr is 9 to 25 wt. %. According to further embodiments, depending on application, the content of Cr is from 11 to 17 wt. % or 5 to 15 wt. % or 20.5 to 25 wt. % or 20.5 to 24 wt. %.

Aluminum (Al)

Aluminum is an important element in the high temperature alloy as aluminum, when exposed to oxygen at high temperature, will form the dense and thin oxide $Al_2O_3$, which will protect the underlying alloy surface from further oxidation. The amount of aluminum should be at least 2.5 wt. % to ensure that the $Al_2O_3$ layer is formed and that sufficient aluminum is present to heal the $Al_2O_3$ layer when damaged. However, aluminum has a negative impact on the formability of the alloy and the amount of aluminum should not exceed 8 wt. % in the alloy as defined hereinabove or hereinafter. Thus, the content of aluminum is 2.5 to 8 wt. %, such as 3-7 wt. %, such as 3-5 wt. %, such as 4 to 6 wt. %, such as 5 to 7 wt. %.

Iron (Fe) and unavoidable impurities are the balance. By the term "unavoidable impurities" is meant elements which are not added by purpose and which does not have any influence on the properties of the alloy.

The high temperature FeCrAl alloy may also comprise the following elements:

Molybdenum (Mo)

Both molybdenum have positive effects on the hot-strength of the high temperature FeCrAl alloy in an amount up to 4.0 wt. %, such as from 1.0 to 4.0 wt. %.

Silicon (Si)

Silicon may be present as an impurity or it may be added to the high temperature FeCrAl alloy. If it is an impurity, the amount may not be more than 0.7 wt. %. If added purposely, the amounts is of from 0.1 to 3 wt. % 0.1 to 3 wt. %, such as 0.5 to 3 wt. %, such as 0 to 0.70 wt. %, such as 0.10-0.70 wt. %;

Manganese (Mn)

Manganese may be present in the high temperature FeCrAl alloy in amount of from 0 to 0.5 wt. %, such as 0 to 0.4 wt. %, such as 0.05 to 0.50 wt. %.

Scandium (Sc), Cerium (Ce) and Lanthanum (La)

Scandium, Cerium, and Lanthanum are interchangeable elements and may be added individually or in combination in a total amount of up to 0.2 wt. % to improve oxidation properties, self-healing of the $Al_2O_3$ layer or the adhesion between the alloy and the $Al_2O_3$ layer.

Oxygen (O)

Oxygen may exist in the high temperature FeCrAl alloy as an impurity resulting from the production process in amounts up to 0.02 wt. %, Oxygen may be deliberately added to achieve a precipitation hardening effect. The high temperature FeCrAl alloy then comprises up to 0.1 wt. % oxygen.

Carbon (C)

Carbon may be included in the high temperature FeCrAl alloy to increase strength by precipitation hardening. Carbon may also be present as an unavoidable impurity resulting from the production process. To achieve sufficient strength in the alloy, carbon should be present in an amount of at least 0.01 wt. %. At too high levels, carbon may result in difficulties to form the material and a negative effect on the corrosion resistance, the maximum amount of carbon is therefore 0.1 wt. %, such as 0.01 to 0.8 wt. %, such as 0.01 to 0.08 wt. %.

Nitrogen (N)

Nitrogen may be included in the high temperature FeCrAl alloy to increase strength by precipitation hardening. Nitrogen may also be present as an unavoidable impurity resulting from the production process. At too high levels, nitrogen may result in difficulties to form the material and may have a negative effect on the corrosion resistance. Therefore, the maximum amount of nitrogen is 0.1 wt. % in the FeCrAl alloy as defined hereinabove or hereinafter. To achieve sufficient precipitation hardening in melt metallurgy, nitrogen should be at least 0.001 wt. %, examples of suitable ranges of nitrogen is for example 0.001-0.1 wt. %, such as 0.01-0.6 wt. %.

Reactive Elements (RE)

Per definition, the reactive elements are highly reactive with carbon, nitrogen and oxygen. Titanium (Ti), Zirconium (Zr), Niobium (Nb), Vanadium (V), Hafnium (Hf), Tantalum (Ta), Yttrium (Y) and Thorium (Th) are reactive elements in the sense that they have high affinity to carbon, thus being strong carbide formers. These elements may be added in order to improve the oxidation properties of the high temperature FeCrAl alloy by balancing the diffusion of metal ions and oxygen, which will govern the kinetics of the oxide growth process. The maximum amounts of respective reactive element will depend mainly on tendency of the element to form adverse intermetallic phases. Hence, the maximum amount of titanium is 1.7 wt. % in the alloy as defined hereinabove or hereinafter, such as 0.02-1.7 wt. %, such as 0-0.10 wt. %.

The maximum amount of zirconium and niobium is 0.8 wt. % in. Example of amounts of zirconium is 0 to 0.4 wt. %, such as of from 0.1 to 0.3 wt. %. Examples of amounts of niobium may be of from 0-0.4 wt. %, such as 0.1 to 0.3 wt. %.

Yttrium may be added in an amount up to 2.2 wt. %, such as of from 0.01 to 0.60 wt. %, such as 0.05 to 0.60 wt. % in order to improve the adherence of the $Al_2O_3$ layer. However, the addition of yttrium must be balance with the amount of other carbide former elements present in the high temperature FeCrAl alloy.

The maximum amount of vanadium is 0.1 wt. %;

Hafnium, tantalum and thorium are interchangeable elements and may be added to in up to 1 wt. %

Hence, according to one embodiment, the high temperature iron-chromium-aluminium alloy additionally comprises one or more elements selected from:
0.1-0.08 wt. % C;
0-0.7 wt. % Si;
0-0.4 wt. % Mn.

According to yet one embodiment, the high temperature iron-chromium-aluminium alloy additionally comprises one or more elements selected from:
0.05-0.60 wt. % Y;
0.01-0.40 wt. % Zr;
0.05-0.50 wt. % Hf;
0.05-0.50 wt. % Ta;
0-0.10 wt. % Ti;
0.01-0.05 wt. % C;
0.01-0.06 wt. % N;
0.02-0.10 wt. % O;
0.05-0.50 wt. % Mn;
0-0.8 wt. % P;
0-0.005 wt. % S.

According to another embodiment, the high temperature iron-chromium-aluminium alloy additionally comprises one or more elements selected from:
0.01-0.1 wt. % C;
0.001-0.1 wt. % N;
0.02-0.10 wt. % O;
0-0.01 wt. % B;
0-0.5 wt. % Mn;
0-2.2 wt. % Y;
0-0.2 wt. % Sc+Ce+La;
0-1.7 wt. % Ti;
0-0.40 wt. % Zr;
0-0.4 wt. % Nb;
0-0.1 wt. % V;
0-0.3 wt. % Hf+Ta+Th.

Examples of the high temperature FeCrAl alloys mentioned herein are e.g. disclosed in WO2001/049441. Tubes according to this embodiment will have good form stability at high temperature and the alloys will form a non-scaling surface oxide providing good protection in most high temperature environments including oxidising, sulphurous and carburising environments. The surface oxide will also provide excellent protection against deposits of carbon, ash, etc. Tubes according to this embodiment will also exhibit superior resistance to e.g. thermal shock, sagging and distortion, due to a superior hot strength and creep rupture strength in comparison with other known FeCrAl alloys. In particular, this is the case for FeCrAl alloys according to this embodiment produced by powder metallurgy.

However, it should be noted that some of the high temperature FeCrAl alloys mentioned herein may be manufactured conventionally, i.e. without using powder metallurgy.

In particular, but not exclusively, the disclosure relates to said high temperature FeCrAl tube for use in heating applications and/or heating devices, such as a radiant tube, a muffle tube, a thermocouple protection tube, a retort tube, a furnace tube, etc.

In particular, but not exclusively, the disclosure relates to a straight tube which is to be vertically installed.

According to another aspect, the present disclosure relates to a method of manufacturing a high temperature iron-chromium-aluminium alloy tube as initially defined, characterised in that it comprises the steps of:
feeding a continuous strip of an iron-chromium-aluminium alloy toward a tube shaping station,
helically winding the strip in the tube shaping station such that long edges of the strip abut each other and a rotating tube moving forward in a direction parallel to its longitudinal axis is formed,
continuously joining said abutting long edges together in a welding process directly when the tube is formed, whereby a welded tube comprising a helical welded seam is obtained.

It was surprisingly found that the high temperature FeCrAl alloy tubes manufactured according to the present method kept their form and length after welding. Additionally, after the high temperature FeCrAl alloy tubes had been manufactured, no cracks were seen during cooling.

According to one embodiment of the present method, the inner diameter (d) of the high temperature iron-chromium-aluminium alloy tube is constant or almost constant along a longitudinal axis.

A welded seam in the form of a butt joint weld is formed, extending at a helix angle around the high temperature iron-chromium-aluminium alloy tube and along its full length. After forming and welding the high temperature iron-chromium-aluminium alloy tube, an annealing to relieve stresses is optionally carried out and the tube is thereafter cut into final length. The method of manufacturing is cost efficient and produces a high temperature FeCrAl alloy tube with properties that are in at least some aspects comparable to those of a corresponding extruded seamless tube, in particular with regard to corrosion and oxidation resistance and load bearing for applications in which the tube is to be vertically mounted, i.e. with its longitudinal axis is extending in a vertical direction. Using continuous strip as a starting material for producing the high temperature FeCrAl alloy tube enables production of a large range of final dimensions.

A high temperature iron-chromium-aluminium alloy tube according to any one of the above described embodiments can be manufactured using the proposed method of manufacturing. The method enables formation of tubes with thinner walls in comparison with extruded tubes with similar diameter. Furthermore, the proposed method will also enable high temperature iron-chromium-aluminium alloy tube with larger diameter to be manufactured in comparison with extruded tubes.

According to one embodiment, the welding process is selected from a fusion welding process or a solid state joining process.

Both fusion welding processes and solid state joining processes are suitable for creating a strong and reliable welded seam.

The welding process may be carried out using a welding electrode positioned radially outside of the formed tube. The welding may also be carried out from inside of the formed tube, or from both the outside and the inside. Carrying out the welding from outside of the formed tube is an easy and efficient way of obtaining a welded joint of sufficient depth for thin-walled strips, i.e. for wall thicknesses of less than approximately 5 mm. For larger wall thicknesses, welding from both the inside and the outside of the tube may be necessary in order to obtain a sufficiently strong welded joint.

According to one embodiment, the welding process is selected from one of a tungsten inert gas welding process, a metal inert gas welding process (MIG), a laser welding process, and a plasma arc welding process. In particular, tungsten inert gas welding (TIG or GTAW) enables formation of a strong, high quality welded seam.

According to one embodiment, a shielding gas is used during the welding process, which shielding gas is an inert gas. The inert gas protects the material from forming aluminium nitrides, and also oxides, along the welded seam. Nitrides and oxides formed during welding may otherwise impair the oxidation resistance of the tube, and thereby also its desirable properties for high temperature applications.

According to one embodiment, the shielding gas consists of Ar (argon), He (helium), or a mixture thereof.

According to one embodiment, no filler material is used in the welding process.

According to one embodiment, a filler material comprising an iron-chromium-aluminium alloy is used in the welding process.

According to one embodiment, the method may further comprise a step of preheating the continuously strip prior to forming the tube. Preheating up to e.g. 100° C. or less makes the strip easier to deform into a tube and is particularly suitable for smaller dimensions, such as for tube with inner diameters of less than 100 mm. The preheating can be achieved using e.g. a furnace, induction heating means, a heat gun, or similar.

According to one embodiment, the method further comprises the step of annealing the high temperature iron-chromium-aluminium alloy tube subsequently to the welding process. The annealing may relieve stress in the welded tube and thereby contribute to cracking prevention. In one embodiment, the annealing is a stress relieving annealing performed in-line in a tube forming apparatus in which the tube is also wound and welded. The tube is heated to a temperature of 850-875° C. and is thereafter allowed to cool before being cut into final length.

Other advantageous features as well as advantages of the proposed tube and method of manufacturing will appear from the following description.

BRIEF DESCRIPTION OF THE DRAWINGS

Embodiments of the proposed high temperature FeCrAl alloy tube and method of manufacturing will in the following be described with reference to the appended drawings, in which FIG. 1 schematically shows a perspective view of a tube according to an embodiment.

DETAILED DESCRIPTION

Figure 1:
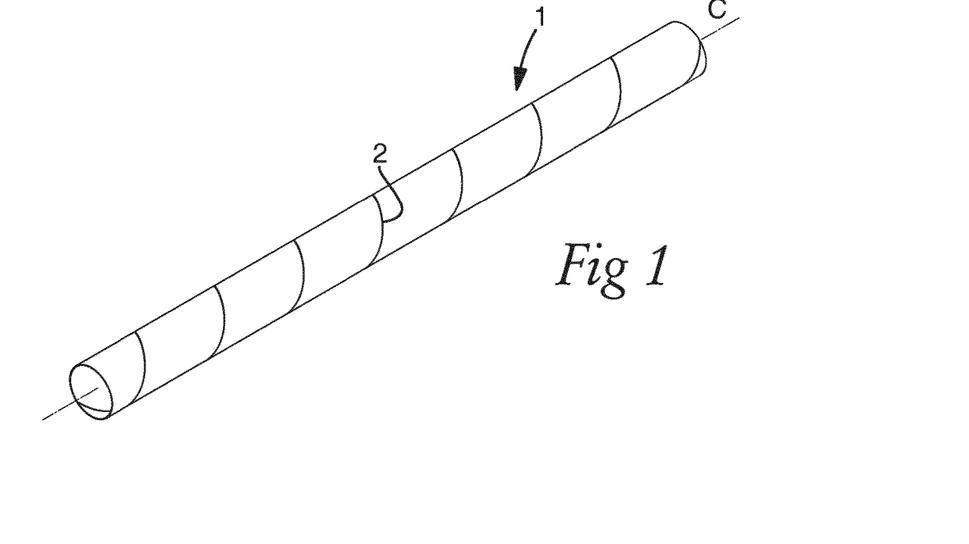
Figure 2:
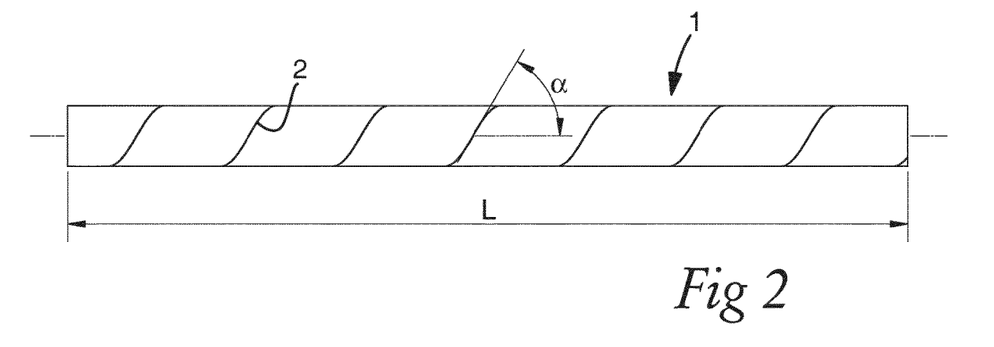
FIG. 2 shows a side view of the tube in FIG. 1.
Figure 3:
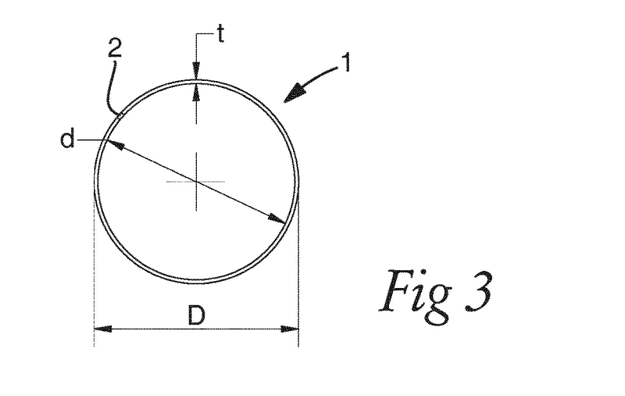
FIG. 3 shows an end view of the tube in FIG. 1, FIG. 4 schematically shows a method of manufacturing the tube in FIG. 1.

A high temperature iron-chromium-aluminium (FeCrAl) alloy tube according to an embodiment of the present disclosure is schematically shown in FIG. 1-3. The tube 1 is in the form of a circular cylinder extending along a longitudinal axis C. The high temperature iron-chromium-aluminium alloy tube 1 is formed with a helical welded seam 2 extending around and along the tube at a helix angle α. In the shown embodiment, the helix angle α is 54°. The shown tube 1 has an outer diameter D of 108 mm, a length L and a wall thickness t of 2 mm, thus having an inner diameter d of 104 mm. The inner diameter d is constant along the longitudinal axis C.

Figure 4:
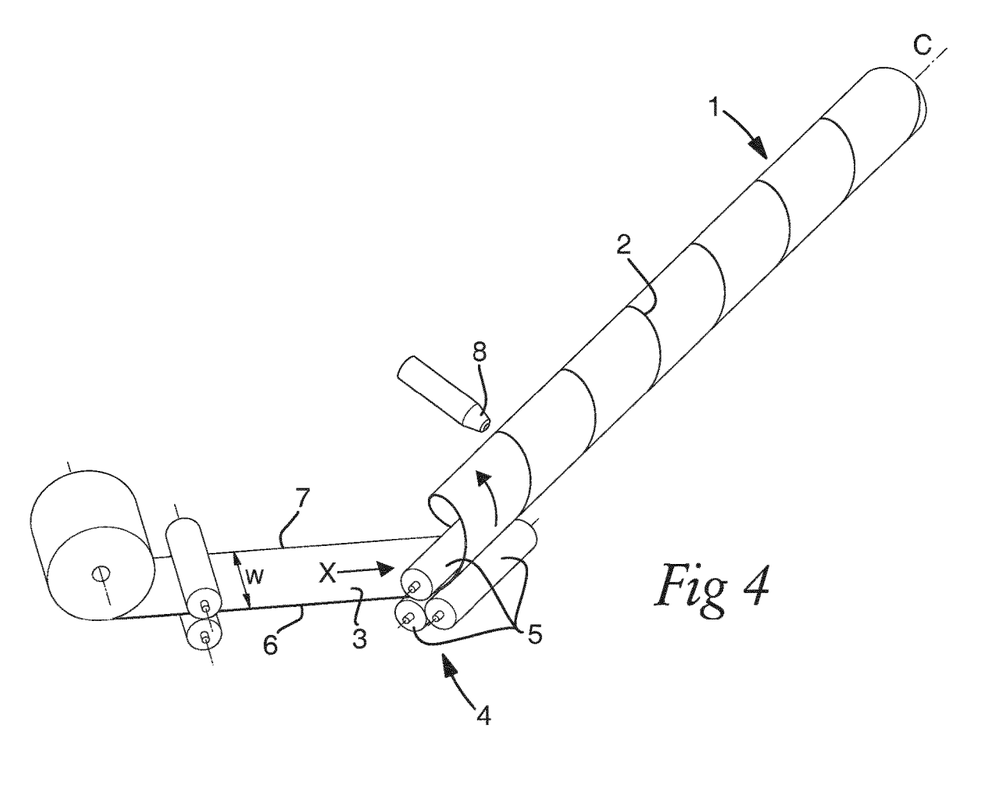
Figure 5:
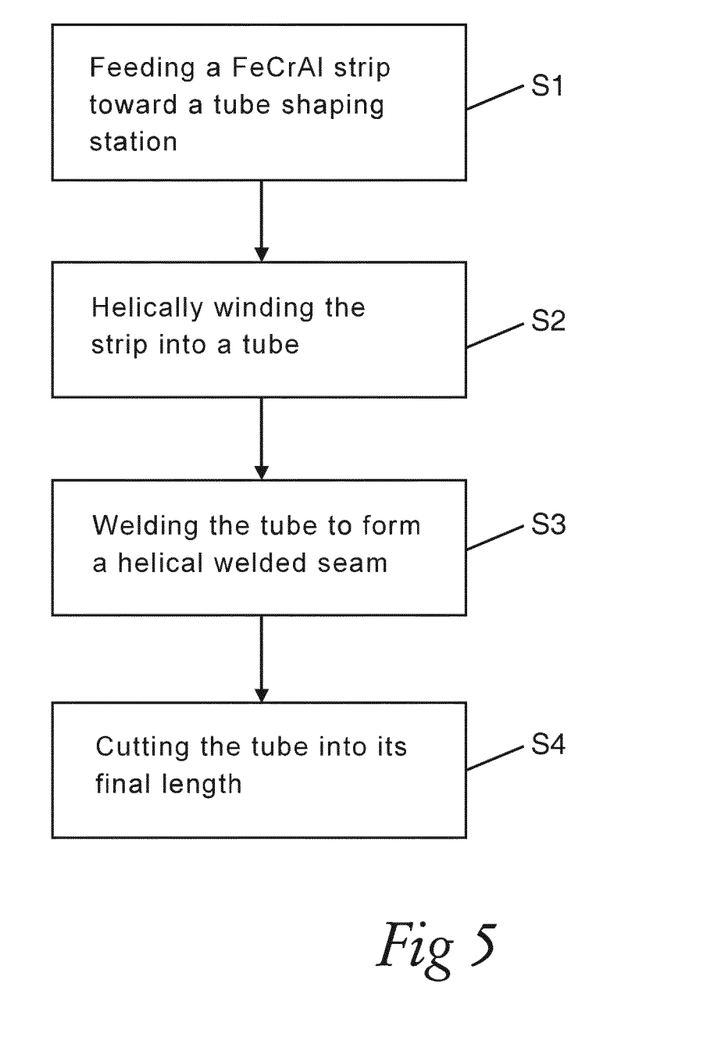
FIG. 5 is a flow chart illustrating steps of a method of manufacturing a tube according to an embodiment.

The tube 1 is formed from a continuous strip 3 of high temperature FeCrAl alloy using spiral welding, as schematically illustrated in FIG. 4 and in the flow chart in FIG. 5. In a first step S1, a continuous strip 3 of the high temperature FeCrAl alloy, having a width w, is fed in a feeding direction X toward a tube shaping station 4, which is here in the form of three shaping rolls 5. The shaping rolls 5 are arranged with their axes of rotation at an angle with respect to the feeding direction X of the strip 3.

When the strip 3 enters between the shaping rolls 5, it is in a second step S2 helically wound into a tube 1, with long edges 6, 7 of the strip 3 abutting each other. A rotating tube is formed, moving forward in a direction parallel to its longitudinal axis C.

In a third step S3, the abutting long edges 6, 7 are continuously joined together in a welding process directly when the tube is formed, whereby the welded tube 1 comprising the helical welded seam 2 is obtained. The welding process is in the shown embodiment carried out using a welding electrode 8 positioned radially outside of the formed tube 1. Thus, the welded seam 2 is created with a welding root on an inside of the formed tube 1. The welding may be carried out using e.g. tungsten inert gas (TIG) welding, metal inert gas welding, laser welding, or plasma arc welding. As a shielding gas during the welding process, an inert gas such as Ar and/or He is used. Also a root gas consisting of Ar and/or He may be used to protect the root during welding.

In a fourth step S4, the tube 1 is cut into its final length L.

The strip 3 may be preheated up to a temperature of 100° C. or less before being wound into a tube 1. The formed tube 1 may furthermore be annealed after welding, before or after cutting the tube 1 into its final length L. During the annealing process, the tube 1 is heated to a temperature of 850-875° C. and is thereafter allowed to cool.

The present disclosure is further illustrated by the following non-limiting example:

Example

For production of test specimens, a tube 1 as described with reference to FIG. 1-3 above was produced from a strip having a width w of 200 mm and a thickness t of 2 mm. The chemical composition of the strip is shown in table 1.

TABLE 1

|  | C | Si | Mn | Cr | Al | Fe |
|---|---|---|---|---|---|---|
| Nominal composition |  |  |  |  | 5.3 | Bal. |
| Min | — | — | — | 20.5 |  |  |
| Max | 0.08 | 0.7 | 0.4 | 23.5 |  |  |

The welding process performed was a TIG process without filler material and with a gas mixture of 70% Ar and 30% He, which was used as both a root gas and a shielding gas. The welding was carried out from outside of the formed tube 1. No support was used on the inside of the tube 1 during welding. The welded high temperature FeCrAl alloy tube 1 was cut into a final length L of 3 m using an angle grinder, without annealing prior to cutting. After cutting into test specimens (tubes) of final length and cooling of the welded seam 2, one of the test specimens 1 was annealed for 1 h at 875° C.

The welded seam 2 had a good appearance directly after welding, on the inside of the tube 1 as well as on the outside. The welded seam 2 was concave on the outside and convex on the inside. Cross sections across the welded seam 2 were visually inspected using light optical microscopy after etching and polishing. No defects were found during the inspection.

The hardness HV10 was investigated across the welded seam 2 and was found to be between 220 and 265 HV across the welded seam, with the highest value in the base material next to the welded seam.

Two other test specimens were pre-oxidised at 1050° C. for 8 h and were thereafter tested in a furnace, mounted vertically with 80 mm diameter cartridge heating elements (26 kW at 200 V voltage) mounted inside the tubes.

The test specimens were subjected to a continuous cycling for one week according to the following scheme:
Heating from room temperature up to 950° C.;
20 min holding time at 950° C.;
Cooling to 600° C.;
Heating up to 950° C.;
20 min holding time; etc.

After one week, the test specimens looked very well upon visual inspection and the testing was continued for another 18 days with a tougher testing cycle. This testing cycle was carried out according to the following scheme:
Heating from room temperature up to 950°;
20 min holding time at 950° C.;
Cooling to 100° C.;
Heating up to 950° C.; etc.

Visual inspection showed that the test specimens looked very fine.

In addition, another test specimen was put at the bottom of the furnace to study whether the weight of the test specimen would result in any deformation during exposure, i.e. a simplified sag test. This test specimen showed no tendency to be distorted during the 18 days exposure.

The invention claimed is:

1. A high temperature iron-chromium-aluminium alloy tube extending along a longitudinal axis, comprising a helical welded seam,
    wherein the tube has an inner diameter that is constant or almost constant along the longitudinal axis of the tube,
    wherein the tube is formed from a continuous strip of an iron-chromium-aluminium alloy, and
    wherein the iron-chromium-aluminium alloy comprises:
        5-25 wt. % Cr,
        4-6 wt. % Al,
        0-5 wt. % Mo,
        0.01-0.60 wt. % Y, and
        the balance being Fe and normally occurring impurities, and
        optionally other intentionally added alloying elements, and
    wherein the high temperature iron-chromium-aluminium alloy tube is annealed.

2. The high temperature iron-chromium-aluminium alloy tube according to claim 1, wherein the tube has a wall thickness of 0.5-7.5% of an inner diameter of the tube.

3. The high temperature iron-chromium-aluminium alloy tube according to claim 2, wherein the tube has a wall thickness of 0.5-4.5% of an inner diameter of the tube.

4. The high temperature iron-chromium-aluminium alloy tube according to claim 1, wherein the helical welded seam extends at a helix angle of 1 to 89° with respect to the longitudinal axis of the tube.

5. The high temperature iron-chromium-aluminium alloy tube according to claim 4, wherein the helical welded seam extends at a helix angle of 40-70° with respect to the longitudinal axis of the tube.

6. The high temperature iron-chromium-aluminium alloy tube according to claim 1, wherein the iron-chromium-aluminium alloy comprises:
    9-25 wt. % Cr;
    4-6 wt. % Al;
    0-5 wt. % Mo;
    0.05-0.60 wt. % Y;
    the balance being Fe and normally occurring impurities, and
    optionally other intentionally added alloying elements.

7. The high temperature iron-chromium-aluminium alloy tube according to claim 1, wherein content of Cr in the iron-chromium-aluminium alloy is 11 to 17 wt. %.

8. The high temperature iron-chromium-aluminium alloy tube according to claim 1, wherein content of Cr in the iron-chromium-aluminium alloy is 5 to 15 wt. %.

9. The high temperature iron-chromium-aluminium alloy tube according to claim 1, wherein content of Cr in the iron-chromium-aluminium alloy is 20.5 to 25 wt. %.

10. The high temperature iron-chromium-aluminium alloy tube according to claim 1, wherein content of Mo in the iron-chromium-aluminium alloy is 1 to 4 wt. %.

11. The high temperature iron-chromium-aluminium alloy tube according to claim 1, further comprising 0.1 to 3 wt. % Si.

12. The high temperature iron-chromium-aluminium alloy tube according to claim 1, wherein the alloying elements include one or more elements selected from:
    0.01-0.40 wt. % Zr;
    0.05-0.50 wt. % Hf;
    0.05-0.50 wt. % Ta;
    0-0.10 wt. % Ti;
    0.01-0.05 wt. % C;
    0.01-0.06 wt. % N;
    0.02-0.10 wt. % O;
    0.05-0.50 wt. % Mn;
    0-0.08 wt. % P;
    0-0.005 wt. % S.

13. The high temperature iron-chromium-aluminium alloy tube according to claim 1, wherein the alloying elements include one or more elements selected from:
    0.01-0.1 wt. % C;
    0.001-0.1 wt. % N;
    0.02-0.10 wt. % O;
    0-0.01 wt. % B;
    0-0.5 wt. % Mn;
    0-0.2 wt. % total of Sc+Ce+La;
    0-1.7 wt. % Ti;
    0-0.4 wt. % Zr:
    0-0.4 wt. % Nb:
    0-0.1 wt. % V:
    0-0.3 wt. % total of Hf+Ta+Th.

14. The high temperature iron-chromium-aluminium alloy tube according to claim 11, wherein content of Si in the iron-chromium-aluminium alloy is 0.5 to 3 wt. %.

15. The high temperature iron-chromium-aluminium alloy tube according to claim 11, wherein content of Si in the iron-chromium-aluminium alloy is 0.10-0.70 wt. %.

16. A method of manufacturing an high temperature iron-chromium-aluminium alloy tube having almost a constant or almost constant inner diameter extending along a longitudinal axis, comprising the steps of:
    preheating a continuous strip of an high temperature iron-chromium-aluminium alloy;
    feeding the preheated continuous strip of the high temperature iron-chromium-aluminium alloy toward a tube shaping station;

helically winding the strip in the tube shaping station such that long edges of the strip abut each other and a rotating tube moving forward in a direction parallel to its longitudinal axis is formed;

continuously joining said abutting long edges together in a welding process directly when the high temperature FeCrAl alloy tube is formed, whereby a welded high temperature FeCrAl alloy tube comprising a helical welded seam is obtained; and annealing the formed high temperature FeCrAl alloy tube, wherein the iron-chromium-aluminium alloy comprises:

5-25 wt. % Cr,
4-6 wt. % Al,
0-5 wt. % Mo,
0.01-0.60 wt. % Y, and
the balance being Fe and normally occurring impurities, and
optionally other intentionally added alloying elements.

17. The method according to claim 16, wherein the welding process is selected from a fusion welding process or a solid state joining process.

18. The method according to claim 16, wherein the welding process is selected from one of a tungsten inert gas welding process, a metal inert gas welding process, a laser welding process, and a plasma arc welding process.

19. The method according to claim 16, wherein a shielding gas is used during the welding process, wherein the shielding gas is an inert gas.

20. The method according to claim 19, wherein the shielding gas consists of Argon, Helium, or a mixture thereof.

21. A heating device comprising a radiant tube, wherein the radiant tube is the high temperature iron-chromium-aluminium alloy tube according to claim 1.

* * * * *